(12) United States Patent
Carlson et al.

(10) Patent No.: US 9,327,454 B2
(45) Date of Patent: May 3, 2016

(54) LIGHTWEIGHT STRUCTURAL MATERIALS

(71) Applicant: EMPIRE TECHNOLOGY DEVELOPMENT LLC, Wilmington, DE (US)

(72) Inventors: William Brenden Carlson, Seattle, WA (US); Gregory D. Phelan, Cortland, NY (US); Vincent Casasanta, III, Woodinville, WA (US); Feng Wan, Issaquah, WA (US)

(73) Assignee: Empire Technology Development LLC, Wilmington, DE (US)

( * ) Notice: Subject to any disclaimer, the term of this patent is extended or adjusted under 35 U.S.C. 154(b) by 167 days.

(21) Appl. No.: 13/878,538

(22) PCT Filed: Dec. 13, 2012

(86) PCT No.: PCT/US2012/069443
§ 371 (c)(1),
(2) Date: Apr. 9, 2013

(87) PCT Pub. No.: WO2014/092710
PCT Pub. Date: Jun. 19, 2014

(65) Prior Publication Data
US 2014/0170398 A1    Jun. 19, 2014

(51) Int. Cl.
*B29C 44/04* (2006.01)
*B29C 67/20* (2006.01)
*B32B 3/26* (2006.01)

(52) U.S. Cl.
CPC ............. *B29C 67/202* (2013.01); *B32B 3/26* (2013.01); *Y10T 428/24967* (2015.01); *Y10T 428/24975* (2015.01); *Y10T 428/249981* (2015.04)

(58) Field of Classification Search
CPC   B29C 67/0081; B29C 67/202; B29C 67/205; B29C 67/20; B29C 67/26; B29C 67/12
USPC .............. 264/250–255, 271.1, 272.11, 279.1, 264/294, 241
See application file for complete search history.

(56) References Cited

U.S. PATENT DOCUMENTS

| 3,254,111 A | 5/1966 | Hawkins et al |
| 4,417,908 A | 11/1983 | Pitcher, Jr. |
| 4,975,225 A | 12/1990 | Vivaldi et al. |

(Continued)

FOREIGN PATENT DOCUMENTS

| CN | 101564621 A | 10/2009 |
| DE | 3305854 C1 | 9/1984 |
| EP | 0587438 B1 | 6/1999 |

OTHER PUBLICATIONS

International Search Report and Written Opinion for PCT/US2012/069443 dated Feb. 25, 2013.

(Continued)

*Primary Examiner* — Stella Yi
(74) *Attorney, Agent, or Firm* — Pepper Hamilton LLP

(57) ABSTRACT

A light-weight material and a method for producing a light-weight material use removable forms to produce an array of interconnected voids within the material. The forms include a plurality of spaced apart and adjoining blocks onto which the material is deposited, and the blocks are constructed of a material that may be desolidified, such as by vaporization, to remove the blocks from the material, leaving behind a network of interconnected voids.

18 Claims, 6 Drawing Sheets

(56) References Cited

U.S. PATENT DOCUMENTS

| | | | |
|---|---|---|---|
| 6,955,853 | B1 | 10/2005 | Tran et al. |
| 2003/0114936 | A1 | 6/2003 | Sherwood et al. |
| 2005/0281999 | A1 | 12/2005 | Hofmann et al. |
| 2006/0159718 | A1 | 7/2006 | Rathenow et al. |
| 2008/0206542 | A1 | 8/2008 | Vance et al. |
| 2008/0251976 | A1 | 10/2008 | Rolland et al. |
| 2011/0151259 | A1 | 6/2011 | Jarman-Smith et al. |
| 2012/0077010 | A1 | 3/2012 | Manesis et al. |

OTHER PUBLICATIONS

Carruthers et al., Polymethylmethacrylate Microspheres/Collagen as a Tissue Augmenting Agent: Personal Experience over 5 Years, *Dermatol Surg* (Nov. 2005), 31:11 Part 2:1561-1565.

Diego et al., Acrylic scaffolds with interconnected spherical pores and controlled hydrophilicity for tissue engineering, *Journal of Materials Science* (Sep. 2005), 40(18):4881-4887 (Abstract).

Frederick et al., Mechanisms of sintering of alkali metal salt aerosol deposits in recovery boilers, *Fuel* (Aug. 2004), 83(11-12):1659-1664 (Abstract).

Goodall et al., Sintering of NaCl powder: Mechanisms and first stage kinetics, *Journal of the European Ceramic Society* (2006), 26(16):3487-3497 (Abstract).

Ivirico et al., Proliferation and differentiation of goat bone marrow stromal cells in 3D scaffolds with tunable hydrophilicity, *Journal of Biomedical Materials Research Part B: Applied Biomaterials* (May 13, 2009), 91B(1):277-286 (Abstract).

Lin et al., Laboratory on a microfluidic chip, *European PubMed Central* (2005), 23(5):456-463 (Abstract).

Sakamoto et al., Relations among NaCl preforming methods, the pore structures and permeability of the spongy cast aluminum, *Reports of the Government Industrial Research Institute, Kyushu* (Oct. 1989), 43, pp. 1-6.

Wetterich et al., Evaporation effects as reflected in freshwaters and ostracod calcite from modern environments in Central and Northeast Yakutia (East Siberia, Russia), *Hydrobiologia* (2008), 614(1):171-195.

Yap et al., Assembly of polystyrene microspheres and its application in cell micropatterning, *Biomaterials* (May 2007), 28(14):2328-2338 (Abstract).

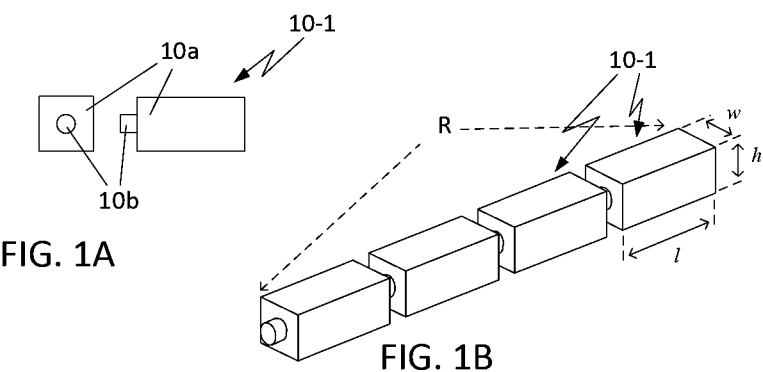
FIG. 1A
FIG. 1B
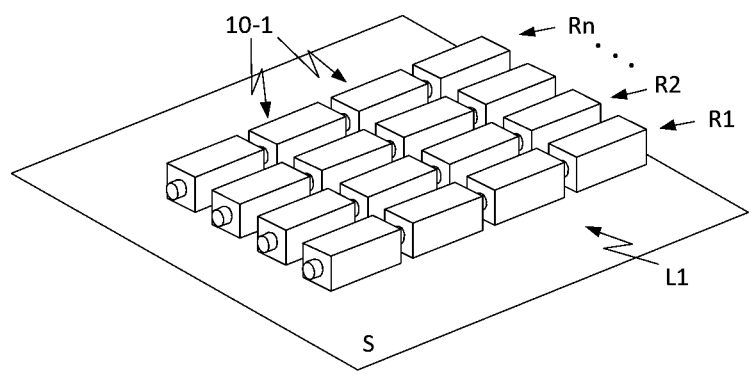
FIG. 1C

LIGHTWEIGHT STRUCTURAL MATERIALS

CLAIM OF PRIORITY

This application is a U.S. national stage filing under 35 U.S.C. §371 of International Application No. PCT/US 2012/069443, filed 12 Dec. 2012 entitled "Lightweight Structural Materials," the disclosure of which is incorporated by reference in its entirety.

BACKGROUND

For most products which are to be handled and/or carried by consumers, the consumer typically prefers lighter weight products while not wanting to lose any product quality or durability. Lighter weight products, in addition to being more desirable for consumers, are often also preferred by manufactures in order to reduce shipping and handling costs. Essentially everything from raw materials and parts to finished products need to be shipped from their point of origin to the consumer.

Consumer electronic products are of particular concern, not only because of shipping costs, but also for environmental reasons. Serious environmental impacts can result from the large volumes of consumer electronic products that enter into and phase out of the market each year. Everything has to be travel over ocean and/or ground at one point. Shipping requires fuel to be burned and carbon dioxide to be expended. The heavier the object, the more fuel it takes to ship. Certain materials used to produce products for consumer and industry have manufacturing processes that are energy intensive and generate large amounts of greenhouse gas and environmental waste. In addition, many waste products end up in landfills and the materials may persist in the environment for thousands of years. Therefore, there is an increased need for ultra-lightweight materials that are not energy intensive to produce, and which materials should also be easy to recycle and preferably biodegradable.

Despite current efforts to develop novel lightweight, environmentally friendly materials, significant technological needs remain unmet. New lightweight and ultra-light-weight materials are needed that are durable (impact-, crack-, rupture-, fatigue-, and corrosion-resistant), formable, transparent, non-toxic, inexpensive to fabricate, manufactured using low environment impact processes, and biodegradable. For certain applications, improved thermal conductivity, electrical conductivity, and optical transparency are also relevant. Such materials having reduced density/weight may find usefulness for applications in space, aerospace, vehicles, industrial products, consumer products, and the human world.

SUMMARY

Presently disclosed are ultra-strong lightweight materials and methods for producing the materials. The materials have voids therein created by removal of a form structure from within the material, thereby replacing a portion of the solid, more dense material with air. Materials having such voids have a reduced weight but may also retain a high strength, thereby providing many benefits and advantages over other materials. Such materials may reduce fuel costs since the objects weigh less and more can be shipped with a given amount of fuel. In addition, vehicles used to ship products may weigh less, and as such may carry more and requires less energy to propel. Thus, lighter weight materials may potentially have great benefits to the carbon footprint and the environment. Consumers generally prefer lighter weight objects that replace commonly used heavier objects, and often may equate a better quality feel to a lighter feel. Carrying lighter objects around may have less wear and tear on the body, and because of this, consumers may feel better and less stressed.

In a manner as presented herein, materials which previously were substantially solid throughout, may be produced with a network of voids therein to reduce the weight of the material. The form structures used for creating the voids may be made of a recyclable non-toxic material, and no toxic solvents are needed for removing the form structures from the materials being produced. As an example, one type of reduced weight structural material may be a polymer material, such as polyethylene terephthalate (PET), produced on a form structure of poly(methyl cyanoacrylate) which may be removed from the PET by heating and vacuum.

In an embodiment, a method is disclosed for producing a material having at least one void therein. The method includes depositing at least a first layer of a matrix material onto a form, wherein the form includes at least one shaped member for forming the at least one void within the material, and the at least one shaped member comprises at least one cyanoacrylate polymer. The method also includes desolidifying the cyanoacrylate polymer within the matrix material, and removing the desolidified cyanoacrylate polymer from the material to leave behind the at least one void within the material.

In an addition embodiment, a form for constructing an article of manufacture is disclosed. The form includes at least one shaped member configured for application of a matrix material thereon, wherein the shaped member is constructed of at least one cyanoacrylate polymer, and the cyanoacrylate polymer is separable from applied matrix material by desolidification of the cyanoacrylate polymer and removal of the desolidified polymer from the material.

In a further embodiment, a light-weight structural material includes a plurality of integrally disposed layers of structural matrix material, wherein each layer has a volume and each layer comprises an array of spaced apart and interconnected voids forming at least about 25% of the volume of the layer.

BRIEF DESCRIPTION OF THE FIGURES

FIGS. 1A-1C depict a form and form arrangement for creating voids in structural materials in accordance with an embodiment.

DETAILED DESCRIPTION

Figure 2A:
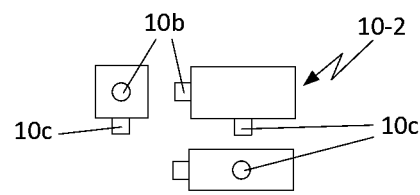
FIGS. 2A-2B depict an alternative form and form arrangement for creating voids in structural materials in accordance with an embodiment.

Creation of voids within structural materials reduces the weight of the material by replacing solid material with air. In an embodiment, a method is provided that creates ultra-strong, lightweight materials using a removable form structure to create voids within the material. A layer of a structural, or matrix material may be deposited on the form structure to surround the form, and after solidification of the structural material, the form may be desolidified to remove the form, leaving a void within the material. As used herein, structural materials, or matrix materials, or structural matrix materials refer to any type of material which may be produced as a non-solid material, and which may then harden or cure to form a structural component or solidified material.

The structural matrix material may be any number of substances, and may include, for example, metals, resins/polymers, ceramics, other inorganic matrices, cementitious matrices and combinations thereof. Some examples of metals may include, but are not limited to, aluminum, iron, copper, zinc, titanium, nickel, magnesium, lithium, gold, silver, steel, brass, bronze, amalgams, and other metal alloys. Some examples of thermoplastic resins may include, but are not limited to polyvinyl chloride, polyethylene, polypropylene, polyethylene terephthalate, acrylic, acetal, nylon, urethane, urea, polytetrafluoroethylene, carbonate, sulfone, cyclics, polybutylene terephthalate, other rigid engineering polymers, and any combinations thereof. Some examples of thermoset resins may include, but are not limited to polyester, vinylester, epoxy, acrylic, phenolic, sulfone, phenyl-formaldehyde, melamine, melamine-formaldehyde, other rigid thermoset engineering polymers, and any combinations thereof. Some examples of inorganic matrices may include, but are not limited to ceramic, anatase, rutile, silicon carbide, diamond, carbon, tungsten carbide, tungstate, molybdate, chromate, zinc oxide, zinc sulfide, zirconate, zirconate titanate, glass, glasses of the metals, glass-ceramic, sol-gel compositions, and any combinations thereof. Some examples of cementitious matrices may include, but are not limited to portland cement, gypsum, polymer modified cement, latex modified cement, epoxy cements, other cementitious materials commonly used in the manufacture or repair of concrete structure, and any combinations thereof.

As discussed further below with reference to the figures, in an embodiment, a brick and mortar approach with removable forms may be used to provide a network of voids within layers of a material. The forms, which in one embodiment may resemble building blocks, may be laid down, and a structural material may be dispersed over the forms to form a layer. This may be repeated, layer by layer, until the desired thickness as required by a particular application is reached. The forms may then be desolidified, allowing the forms to be removed from the surrounding solid material.

The forms may have any shape. In an embodiment as represented in FIGS. 1A-1C, a form may be at least one shaped member 10-1. A shaped members 10-1 may have a main body portion 10a which may be cuboidal in shape as shown, or may be of any other shape, such as tubular, hexagonal, spherical, ovoid, or disc-shaped. In addition, a shaped member 10-1 may also have a spacer portion 10b of a reduced perimetrical size and cross sectional area in comparison with the remaining body portion 10a. In an embodiment as shown, the spacer portion 10b may be cylindrical, and may have a length extending away from the body portion 10a of about ¼ to about ½ of the length of the body portion, and the cross sectional area may be about ⅙ to about 1/10 of the cross-sectional area of the body portion.

One type of material which may be used for producing the form structure, or building blocks, includes cyanoacrylate polymers. Cyanoacrylate polymers are generally highly polar and may extensively crosslink. The monomers of various cyanoacrylates are often used as superglues. The alpha cyano moieties readily bond together as represented by the following depiction of the polymerization of methyl cyanoacrylate to form poly(methyl cyanoacrylate).

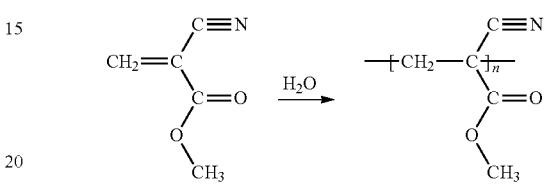

Poly(methyl cyanoacrylate) is an acrylic that is similar to Plexiglas®. The monomers polymerize by anionic vinyl polymerization, wherein trace amounts of moisture act as an initiator, and the reaction proceeds very quickly.

The polymers of cyanoacrylates may be converted back to the monomer state at relatively low temperatures. For example, poly(methyl cyanoacrylate) begins to revert back to the monomer at about 150° C., and rapidly reverts back at about 170° C. Further, the boiling point under vacuum of methyl cyanoacrylate monomer is about 49° C. Thus, when poly(methyl cyanoacrylate) is heated to about 150° C., the poly(methyl cyanoacrylate) depolymerizes to methyl cyanoacrylate monomers, which in turn instantly vaporize. When used as the material for the forms, cyanoacrylate polymer forms encased within a structural material may be desolidified by heating the structural material to a temperature sufficient for depolymerizing the cyanoacrylate polymer to cyanoacrylate monomers, which then vaporize. The vaporized monomers may be drawn out of the material by applying a vacuum, leaving behind a void, or voids within the material.

In an embodiment, the cyanoacrylate polymer used for forming the structural form may be least one polyalkyl cyanoacrylate. As examples, the at least one polyalkyl cyanoacrylate may be one of: polymethyl cyanoacrylate (boiling point 49 C., 2.7 mmHg), polyethyl cyanoacrylate (boiling point 56 C., 3 mmHg), polypropyl cyanoacrylate (boiling point 214 C., 760 mmHg), polybutyl cyanoacrylate (boiling point, 84 C., 3 mmHg), polyoctyl cyanoacrylate (boiling point 118 C., 1.8 mmHg), or combinations thereof. Higher carbon-chain monomers, i.e. poloctyl—will generally have a higher depolymerization temperature than shorter chain monomers, i.e. polymethyl. As such, the longer chain monomers may only be usable with structural materials having higher degradation temperatures, i.e. metals, to avoid degradation of the structural material prior to removal of the polymer forms.

Other cyanoacrylates and the resultant polymers may also be suitable and effective, and may include, but are not limited to, isopropyl, iso-butyl, n-pentyl, 2-pentyl, 3-pentyl, n-hexyl, 2-hexyl, 3-hexyl, n-heptyl, 2-heptyl, 3-heptyl, 4-heptyl, 2-octyl, 3-octyl, methoxy ethyl, ethoxy ethyl, propoxy propyl, cyclobutyl, cycloheptyl, cyclohexyl, cyclooctyl, cyclopentyl and allyl cyanoacrylates.

Cyanoacrylate polymers provide several advantages for use as form materials, and in this regard, the advantages of poly(methyl cyanoacrylate) are presented as an example. Poly(methyl cyanoacrylate) depolymerizes at a low temperature, and unlike other materials, poly(methyl cyanoacrylate) does not require any additional extraction solvents that are harmful to the environment. Further, poly(methyl cyanoacrylate) does not melt like paraffin and does not leave behind any residue. Poly(methyl cyanoacrylate) also has very little solubility in many organic solvents such as aromatics and esters, and poly(methyl cyanoacrylate) has excellent adhesion to metals and ceramics due to the cyano moieties. Very sharp interfaces between metal and poly(methyl cyanoacrylate) also occur which allows for highly reliable manufacturing techniques. In addition, the poly(methyl cyanoacrylate) may readily be depolymerized into its monomer which is completely recyclable, and since no harsh chemical solvents are required to clean parts, is also environmentally friendly. The poly(methyl cyanoacrylate) may also essentially be shaped into any shape which may be desired.

Pre-polymerized shaped members 10-1 may be obtained for use as the structural form for producing the voids. Alternatively, cyanoacrylate shaped members 10-1 may be produced by packing cyanoacrylate beads into a mold of essentially any desired shape as previously discussed, and fusing the beads together. The beads may be of a uniform size, or may be of two complementary sizes (as may be determined from mathematical formulas for packing of spheres), or may be of various sizes. The size of the beads may be about 100 nanometers to about 100 microns. The beads may be packed into the molds by using sonication, and fused together by subjecting the bead-packed molds to a temperature sufficient for bead fusion.

As an example, poly(methyl cyanoacrylate) microspheres having a diameter of about 90 $\mu$m±10 $\mu$m may be introduced into a mold having a desired shape, such as a rectangular mold which may be used to produce components 10-1. The microspheres may then be sonicated, fluidized and compressed in the mold, and heated to a temperature of about 120° C. to about 125° C. or about 30 minutes to fuse the beads together. This method has attained a high porosity using typical compaction values of 60-65% for random mono-sized spherical particles.

In an alternative embodiment, as discussed in more detail further below with reference to FIG. 10, instead of using pre-formed cyanoacrylate components 10-1, a thickness of cyanoacrylate monomers may be 'printed' onto a surface in a similar manner as to the manner in which inks are deposited onto paper to produce a printed image, whereby the monomers may then polymerize and cure to form a solid directly on the surface.

The size, shape and orientation of the forms may be dependent on the type of structural material, or materials, being used, as well as the desired thickness of the layers and the desired volume of void space within the material. The volume of the forms as the void space may be about 5% to about 80% of the volume of the material. In embodiments, the percent volume of the forms as void space may be about 5%, about 10%, about 15%, about 20%, about 25%, about 30%, about 35%, about 40%, about 45%, about 50%, about 55%, about 60%, about 65%, about 70%, about 75%, about 80%, or any percentage between any of the listed values, or greater than or less than the listed values.

As shown in FIG. 1B, shaped members 10-1 may be aligned in rows R, and, as depicted in FIG. 1C, rows R1-Rn of the spacer units may be arranged side by side on a surface S to form a layer of blocks L1. When aligned, the spacer portions 10b space the blocks of main body portions 10b apart from one another so that, when coated with structural material, the material may fill in the gaps around the spacer portions, providing extra material support. In addition, once volatilized, the spacer portions 10b provide interconnecting channels in each row R1-Rn to allow for removal of vaporized polymers from within the material (see also FIG. 8).

Figure 3A:
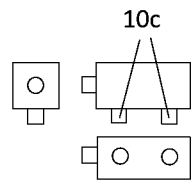
FIGS. 3A-3C depict an alternative form and form arrangement for creating voids in structural materials in accordance with an embodiment.
Figure 3B:
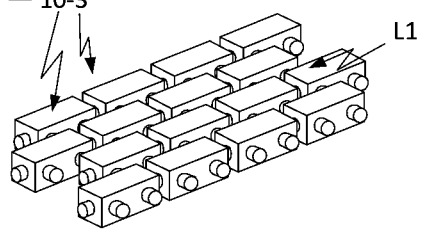

In a similar manner as depicted in FIG. 3B, the rows may be positioned such that the shaped members 10-1 in one row are in a staggered arrangement with the shaped members of adjacent rows, essentially resembling the manner in which bricks are laid in the construction of buildings.

Figure 2B:
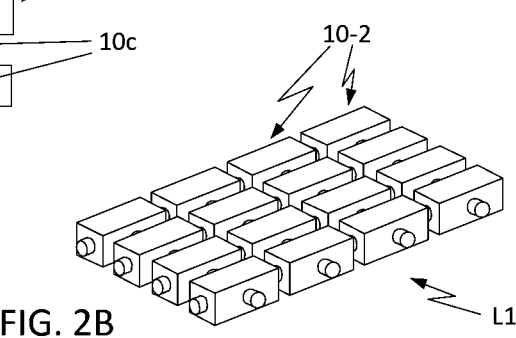
Figure 3C:
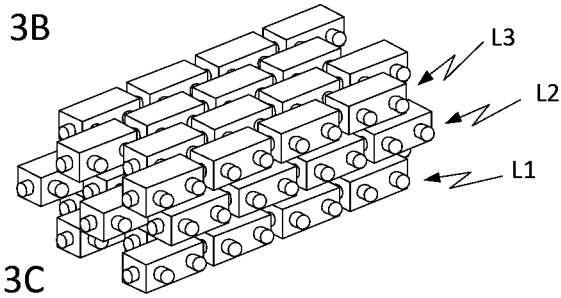

Additional embodiments of shaped members are depicted in FIGS. 2A, 2B and 3A-3C. Shaped member 10-2 in FIGS. 2A and 2B includes an additional spacer portion 10c located on one of the longitudinal surfaces of the body portion 10a. Spacer portions 10b may then provide end spacing between units 10-2, and the additional spacer portions 10c may provide side to side spacing. Shaped member 10-3 in FIGS. 3A-3C include two additional spacer portions 10c located on one of the longitudinal surfaces of the body portion 10a. Spacer portions 10b may then provide end spacing between units 10-2, and the additional spacer portions 10c may provide side to side spacing when the units 10-3 are arranged in a staggered manner. FIG. 3C depicts a representation of three staggered layers of arrayed spacer members 10-3 (but with interspersed structural matrix material not shown) as they may appear in relation to one another during production of a lightweight material.

Figure 4:
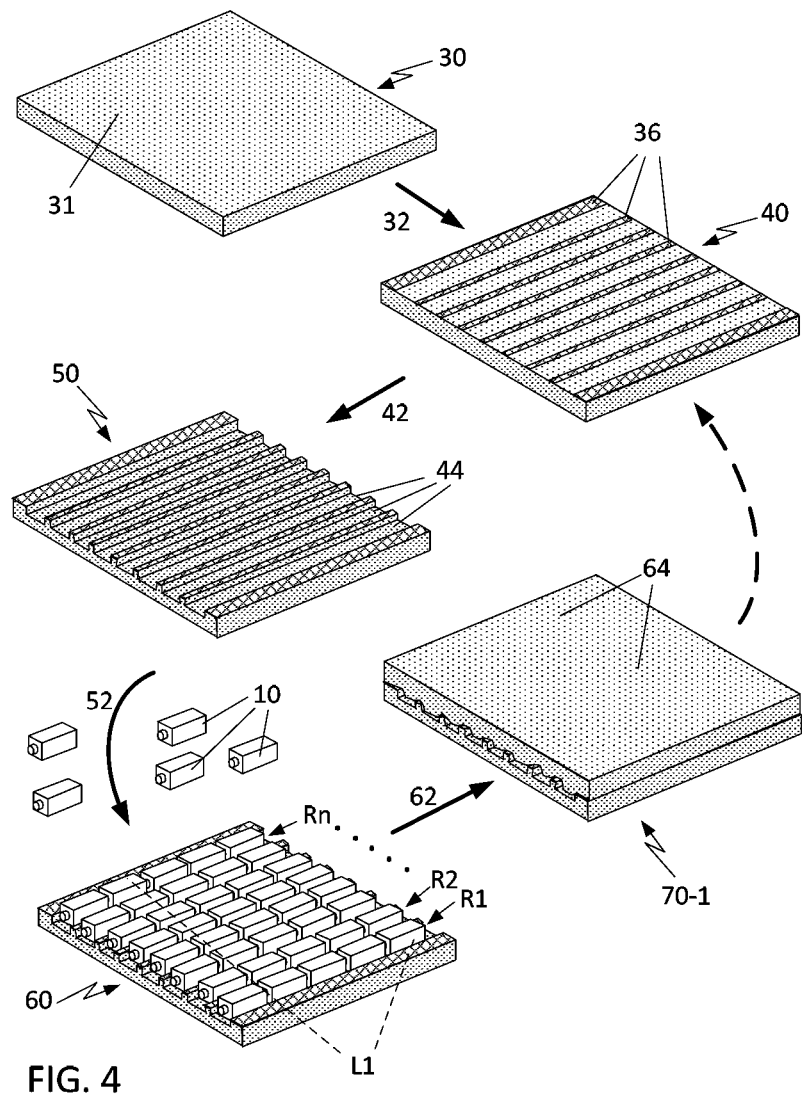
FIG. 4 illustrates a series of method steps for producing a layered material encasing forms for creating voids within the material in accordance with an embodiment.
Figure 9:
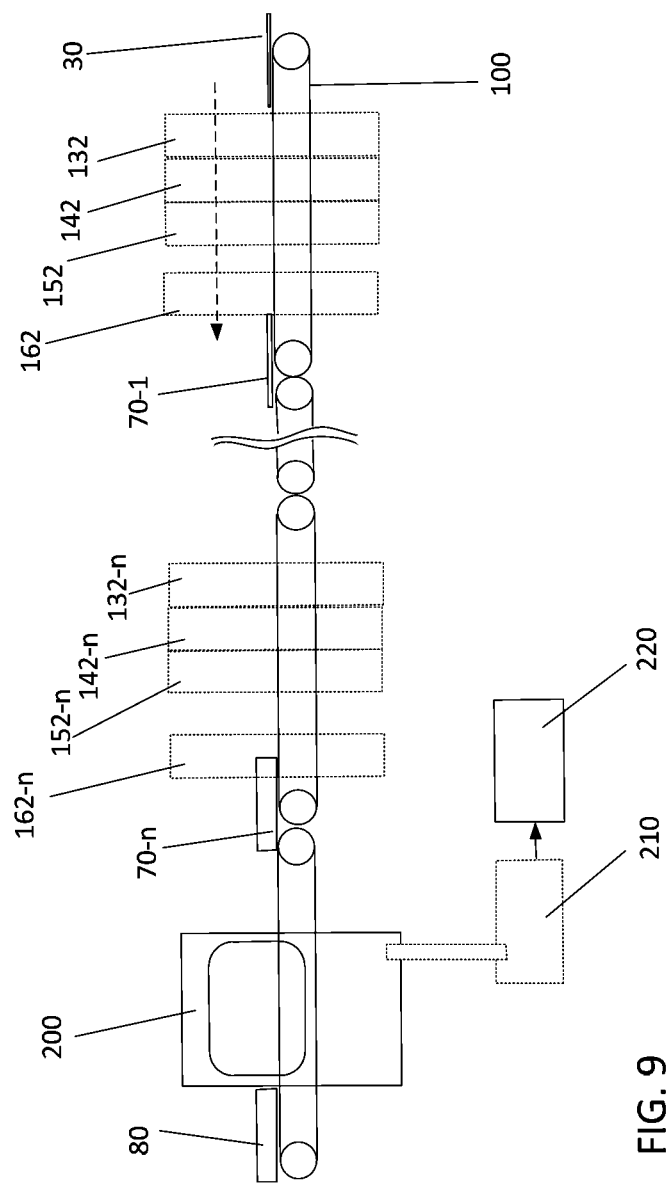
FIG. 9 is a schematic representation of an integrated system for producing a lightweight structural material in accordance with an embodiment.

One process for producing lightweight materials according to an embodiment is generally depicted in FIG. 4. Such a process may be conducted via a continuous conveyance system such as is schematically illustrated in FIG. 9.

The shaped members 10-1 may be deposited on a surface in a manner similar to that in which liquid crystals are deposited for liquid crystal displays. In FIGS. 4 and 9, an initial structural material layer 30 may be prepared, or obtained and placed on a conveyor 100 for processing. Material layer 30 may be conducted through a masking system 132 wherein a masking procedure 32 applies a masking material 36 on the surface 31. The resultant masked layer 40, may then be processed in an etching system 142 to expose the masked layer to an etching procedure 42 wherein a plurality of essentially parallel grooves 44 may be etched into the surface 31 to provide a grooved layer 50. Grooved layer 50 may then be processed in a deposition system 162 wherein shaped members 10 may then be deposited 52, onto the grooved layer 50 to provide a material layer 60 having a layer L1 of a plurality of parallel rows R1-Rn of shaped members 10. Layer L1 may be configured in the manner of any of the arrangements as depicted in FIG. 1C, 2B or 3B, or any other arrangement as may be desired.

In an alternative embodiment, for some shaped members 10, a sheet of interconnected shaped members may be formed or molded as an interconnected array of contiguous members. The whole sheet may then be deposited on the starting material 30 to produce the material layer 60.

A layer of structural matrix material 64 may be deposited on the layer 60 by an application process 62 in an application system 162 to fill in the spaces between the shaped members 10 and cover the shaped members. The application 62 may be accomplished in a variety of ways including solvent or water based spray systems, deposition of monomers for polymerization, or by vapor deposition. Vapor deposition may allow for roll to roll manufacturing such as that used for metallic coated films, such as for potato chip bags, wherein the process includes vapor deposition of metal onto a plastic surface. Alternatively, ultraviolet polymerizable monomers may be sprayed onto the surface of the layers, and then passed under an ultraviolet light source to polymerize the polymers. The selection of the deposition method may be dependent on the type of material to be deposited. Metals may be vapor deposited while polymers may be applied as monomers and then polymerized. The laid down material 64 may completely surround the blocks 10 much like mortar surrounds bricks to produce a layered material 70-1.

In an embodiment wherein the overall thickness of a layer is on the order of a few microns, the form members may be produced on a micron scale, and the cuboidal body portions 10a may have dimensions (length (l)×width (w)×height (h) see FIG. 1B) wherein the length is about 2 μm to about 10 μm, the width is about 1 μm to about 5 μm, and the length is about 1 μm to about 5 μm. The spacer portions 10b may project about 0.5 micrometers to about 1.5 micrometers away from the body portion 10a, and may have a diameter of about 0.5 micrometers to about 1.5 micrometers. The thickness of the applied layer 64 on the tops of the blocks 10 may be about 1 micrometer to about 5 micrometers.

In an embodiment, for example, the length may be about 5 μm, the width may be about 2.5 μm, the height may be about 2.5 μm, the spacer may extend about 1 μm and have a diameter of about 1 μm. The blocks will therefore have a volume of about 34 μm$^3$. With a 1 μm thick layer of material on the top of the blocks 10, and a spacing between rows of blocks of about 1 μm, the blocks (and therefore the voids created by the blocks) will occupy about 46% of the volume of the material being produced. If the thickness of material applied over the blocks is increased to about 5 μm, the blocks (and therefore the voids created by the blocks) will occupy about 21% of the volume of the material being produced.

While the above discussion is directed towards micron scale layers, the same will also be applicable to millimeter scale layers, or centimeter sale layers, etc., as determined by the thickness of the product being produced. In this regard, the cyanoacrylate blocks may be of a larger size, such as, for example, 1.5 mm (l)×0.8 mm (w)×0.8 mm (h), and may be coated with about 0.2 mm of structural material to produce 1 mm thick layers. Or, for thicker layers, the cyanoacrylate blocks may be, for example, 1.5 cm (l)×0.8 cm (w)×0.8 cm (h), and may be coated with about 0.2 cm of structural material to produce 1 cm thick layers. The size of the blocks, thicknesses of the coating materials and number of layers deposited may be varied as required for the materials being produced.

Figure 5:
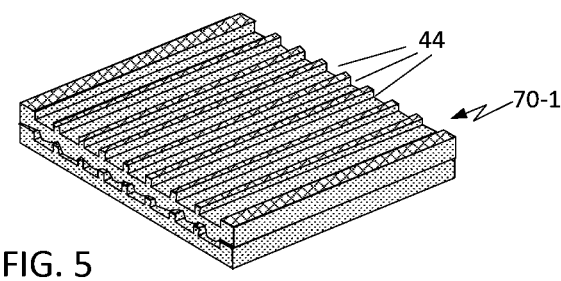
FIG. 5 depicts an etched intermediary layer in accordance with an embodiment.
Figure 6:
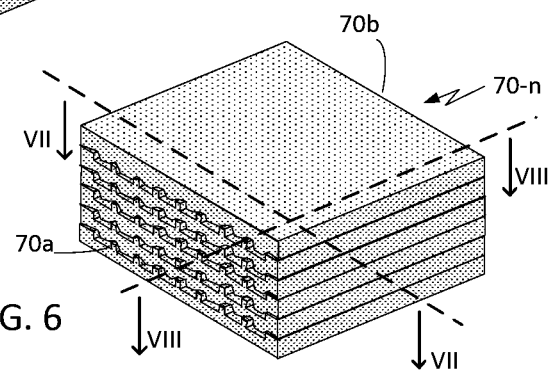
FIG. 6 depicts a multi-layered material encasing forms for creating voids within the material in accordance with an embodiment.

Additional layers of shaped members 10 and structural material 64 may be applied to the layered material 70-1 by repeating the process steps of masking 32, etching 42, depositing 52, and applying 62. FIG. 5 depicts a representation of the layered material 70-1 after masking and etching to produce parallel grooves 44 in preparation for depositing of shaped members 10 thereon. The representation of FIG. 6 depicts a layered material 70-n after receiving five depositions of shaped members and structural matrix material. While each layer is shown having the same thickness, the layers may be of varying thickness.

The described process steps may be repeated, as necessary, to produce a desired thickness of the layered material 70-n. As depicted in FIG. 9, each layer may be applied by a separate deposition/application segments along the conveyance system wherein each segment may have a pairing of form placement stations (132, 142, 152) and a material application station (162). Alternatively, a single station may be used to provide each layer by returning the layered materials back to the starting position.

Figures 7, 8:
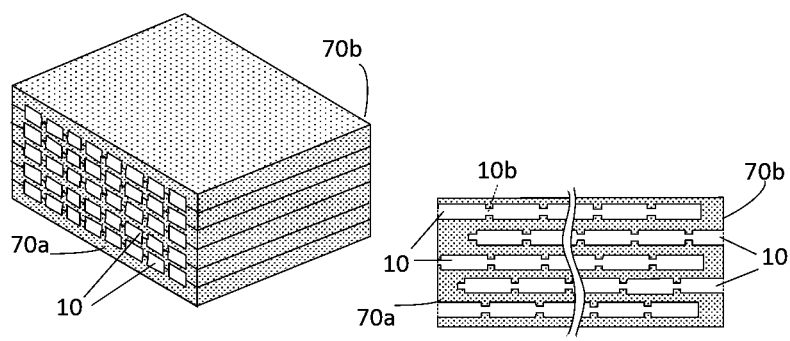
FIG. 7 depicts a cut-away view of the layered material of FIG. 6 taken along the line VII-VII.
FIG. 8 depicts a cross-sectional view of the layered material of FIG. 6 taken along the line VIII-VIII.

After layering is completed, the front and back faces of the material 70a and 70b respectively, may be covered with structural material 64 from the application processes 62 as previously described. This coating may cover the ends of the rows Rn of shaped members 10 as depicted with layered material 70-1 in FIG. 4. In order to be able to remove the material forming the shaped members 10 from the resultant layered material 70-n, such as that represented in FIG. 6, at least one, or both of the end surfaces 70a and 70b may require a trimming process to expose the shaped members 10 at the end surfaces as shown in FIG. 7. FIG. 8 depicts an alternative cross-sectional view of the layered material of FIG. 6 (along the line VIII-VIII) for a system of layers which are in a staggered array, such as that shown in FIG. 3C. As shown in the cross section represented by FIG. 8, the end to end contact of the shaped members 10 via the spacer portions 10b provides a continuous path of shaped members through the material. In further embodiments, which may be provided by depositing shaped members 10-2 of FIG. 2A or 10-3 of FIG. 3A, contact may also be provided between adjacent shaped members of adjacent rows of shaped members.

Figure 10:
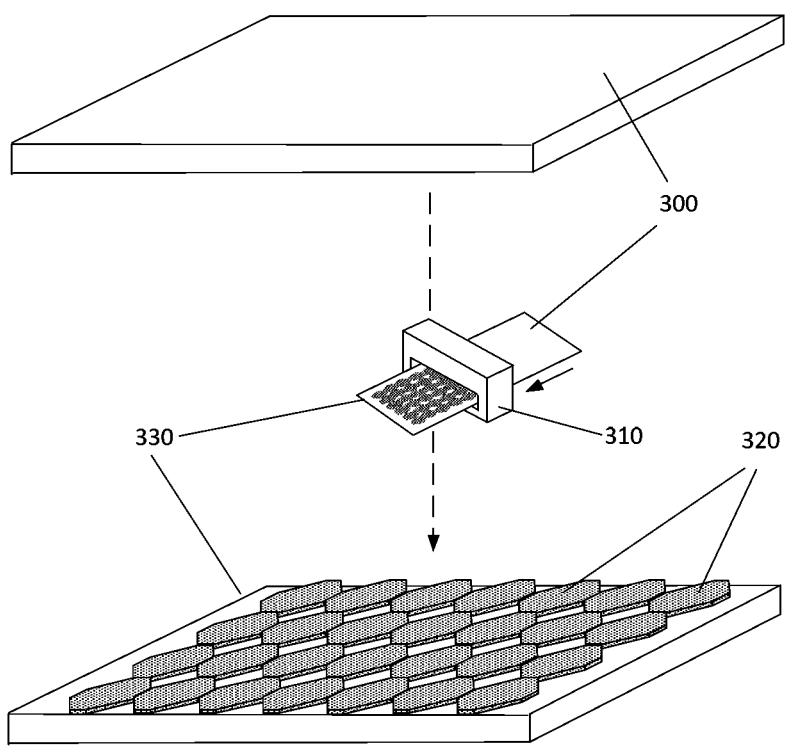
FIG. 10 is a representation of a printing procedure for applying cyanoacrylate to a surface according to an embodiment.

In an additional embodiment as briefly mentioned earlier, instead of using pre-formed blocks 10-1 and depositing the blocks onto a surface to form the layers 70-n, the cyanoacrylate monomers may be printed onto a surface as depicted in FIG. 10. Some examples of printing equipment 310 which may be usable for the deposition of patterns of cyanoacrylate are produced by Microfab Technologies of Plano, Tex. Another example of printing equipment is the Dimatix Materials Printer produced by FUJIFILM of Santa Clara, Calif. The Dimatix printer is based on piezoelectric technology that uses mechanical deformation to create acoustic vibrations to force fluid out of a nozzle and pull more fluid into the reservoir to replace the fluid that has been jetted out.

A sheet of starting material 300 may be fed through a printer 310 configured for depositing cyanoacrylate monomers 320 onto the sheet. As the sheet 300 passes through the printer 310 a three-dimensional pattern of cyanoacrylate 320 may be deposited. The cyanoacrylate 320 may then be allowed to polymerize and cure to form a completed layer 330. The deposited cyanoacrylate 320 may have a thickness of about 10 μm to about 2 mm. For thicker cyanoacrylate patterns, a sheet may be passed through the same printer several times, or a series of printers to provide additional layers of cyanoacrylate on the previous layer. The layer 330 may then be further processed in a manner as was discussed above for the layer 60 in FIG. 4, wherein structural material may be applied over the cyanoacrylate to form a layer 70-1. A layer 70-1 may then be passed through the printer 310 to deposit additional cyanoacrylate, and the process steps may be repeated until a desired number of layers (similar to 70-n in FIG. 6) is achieved.

As an example, the starting material 300 may be titanium foil and the cyanoacrylate 320 may be printed onto the surface of the foil and allowed to cure. An additional titanium layer may then be deposited upon the printed cyanoacrylate by at least one of electrochemically or by chemical vapor deposition. The printing and curing of cyanoacrylate and vapor deposition of titanium may be repeated as needed to achieve a desired thickness.

Returning back to FIG. 9, upon completion of the layering steps, a layered structure 70-n may be put into a heating and vacuum chamber 200 to remove the cyanoacrylate polymer. The layered structure may be heated to a temperature sufficient to cause the polymers to be vaporized. A vacuum may be applied to pull the vapors out of the material, leaving behind a network of interconnected voids, resulting in a micro-porous structure 80 of great strength and of reduced weight. As mentioned previously, when the shaped members are made from methyl cyanoacrylate/poly (methyl cyanoacrylate), the system may be heated to a temperature of about 150° C. to about 200° C. The poly (methyl cyanoacrylate) polymer may begin to depolymerize into the methyl cyanoacrylate monomers at about 150° C., and the monomers will instantly vaporize as this temperature is above the vaporization temperature of the monomers. The monomers may then be withdrawn by vacuum.

The withdrawn monomers may be collected from the system and collected in a condensation arrangement 210. The monomers may then be recycled in a processing system 220 where they may be formed into additional shaped members for producing additional lightweight materials. Alternatively, the recycled monomers may be used for other processes.

The layered structure may be varied in a variety of ways. For example, each layer may be of a different thickness, or different materials may be used for each succeeding layer. In this regard, each layer may be a different metal, a different polymer, a different ceramic, or any combination of any of these materials, and a micro-porous, laminated structure may be created. Repeating patterns of layered material may be deposited, such as alternating and repeating first and second materials, or first, second and third materials. Alternatively, the top and bottom layers may be protective layers, such as metallic layers enclosing layers of polymers therebetween.

Laminate structures may offer advantages over a uni-material system. Laminates may have greater impact resistance due to increased energy that it takes to penetrate the individual layers. Laminate structures may be much stronger due to the differing surface tensions of each individual layer. Laminate structures may also have greater resistance to corrosion and be affected less by abrasion. Many particular applications exist where laminate structures may be useful, or more useful than uni-material systems.

EXAMPLES

Example 1

A Form for Creating Voids in Structural Material

Lightweight structural polymeric materials may be manufactured by applying the structural materials over removable forms which produce voids within the material. A polyethylene terephthalate (PET) product will have a melting temperature of about 260° C. Forms for producing voids within the PET during production of the material will be constructed of poly(methyl cyanoacrylate) which has a depolymerization temperature of about 170° C.

Form members having a size of about 9 μm by about 6 μm by about 6 μm and having a reduced circumference spacer projecting about 3 μm from a longitudinal end will be produced for forming the voids. To produce the form members, methyl cyanoacrylate beads having a size of about 90 nanometers will be placed in rectangular molds of the above-dimensions, sonicated to pack the beads, and fused together at a temperature of about 120° C. and a pressure of about 517 kilopascal (75 psi) for about 30 minutes. A plurality of the form members will be disposed in contact with one another to provide a form layer to be coated by structural material.

Example 2

A Method for Producing a Lightweight Polymeric Material

An initial structural material layer of polyethylene terephthalate (PET) having a thickness of about 10 μm will be deposited on a non-stick silicone substrate. The PET layer will be masked and etched to produce parallel grooves in the surface. Poly(methyl cyanoacrylate) form members of Example 1 will be deposited in the grooves. A second layer of PET having a thickness of about 5 μm will be deposited over the form members to penetrate between the adjacent form members and form a new substantially planar surface, and the PET will be cured. The new layer will have a thickness of about 10 μm. The above steps of etching, depositing and coating will be repeated about 20 times to produce a composite material layer having a thickness of about 0.2 mm, wherein each layer will have a thickness of about 10 μm.

An edge of the composite material layer will be trimmed to expose the poly(methyl cyanoacrylate) form members, and the trimmed sheet will be placed in a vacuum chamber where it will be heated to about 170° C. to depolymerize the poly (methyl cyanoacrylate) into methyl cyanoacrylate monomers which will instantly vaporize at that temperature. The vacuum will draw off the vaporized monomers, producing a lightweight PET sheet material having a thickness of about 0.2 mm (200 μm) wherein about 30% of the volume of the sheet will be void space, thereby providing a 30% reduction in the material weight. Vaporized monomers will be collected, condensed and recycled into additional form members.

Example 3

A Method for Producing a Lightweight Silicone

An initial structural material layer of silicone having a thickness of about 10 μm will be used as the initial, bottom layer. Poly(ethyl cyanoacrylate) form members will be produced in the same manner as the poly(methyl cyanoacrylate) form members in Example 1. The poly(ethyl cyanoacrylate) form members will be deposited onto the silicone to form a first matrix layer of form members.

A mixture of vinyl terminated methyl phenyl siloxane, silane terminated methyl phenyl siloxane, methylhydrosiloxane-dimethylsiloxane copolymer as a crosslinker and 20 ppm of platinum octanaldehyde will be injected into the matrix and heated 100° C. for two hours to cure the silicone polymer.

Additional matrix layers of form members will be deposited, covered with a layer of silicone and the silicone will be cured to produce a composite silicone sheet.

The composite sheet will be placed in a vacuum chamber where it will be heated to about 175° C. to depolymerize the poly(ethyl cyanoacrylate) into methyl cyanoacrylate monomer. The monomer will vaporize at this temperature and pressure and a vacuum will be used to draw off the vaporized monomers, producing a lightweight silicone product. The vaporized monomers will be condensed and recycled into additional form members.

Example 4

Lightweight Structural Materials for Lap-Top Computers

A metal sheet will be produced using cyanoacrylate forms (as made in Example 1) to produce a reduced weight metal structural/protective cover for laptop computers. The metal will be formed from alternating layers of titanium and aluminum alloys.

An initial material layer of titanium of a thickness of about 10 μm will be deposited on a non-stick silicone substrate. The titanium layer will be etched to produce parallel grooves in the surface, and poly(methyl cyanoacrylate) form members will be deposited in the grooves. An aluminum layer having a thickness of about 6 µm will be vapor deposited over the form members to penetrate between the adjacent form members and form a new substantially planar surface. The completed layer will have a thickness of about 12 µm. The above steps will be repeated about 20 times with alternating vapor depositions of titanium and aluminum to produce a composite metal sheet having a thickness of about 0.25 mm.

An edge of the metal composite sheet will be trimmed to expose the poly(methyl cyanoacrylate) form members, and the trimmed sheet will be placed in a vacuum chamber where it will be heated to about 170° C. to depolymerize the poly(methyl cyanoacrylate) into methyl cyanoacrylate monomers which will instantly vaporize at that temperature. The vacuum will draw off the vaporized monomers, producing a lightweight titanium-aluminum layered product, and the vaporized monomers will be condensed and recycled into additional form members.

The composite sheet will be cut into portions having a size needed for the computer case, and the cut sheet portions will be pressed into a mold to turn up the edges to form the cover portions for a laptop computer.

Example 5

Lightweight Structural Materials with Printer Deposition

An inkjet printer will be converted for cyanoacrylate deposition. Cartridges of the inkjet printer will be filled with methyl cyanoacrylate/poly(methyl cyanoacrylate) (PMCA) having a viscosity of about 1100 cps. Titanium foil that is about 127 micrometers (0.005") thick will be passed through the inkjet printer and a pattern of the cyanoacrylate will be printed onto the titanium sheet and allowed to cure. The polymer pattern will be about 100 µm thick.

Titanium will be subsequently deposited onto the patterned surface. The titanium will be deposited by chemical vapor deposition. The Ti/PMCA/Ti composite will then be passed through the printer where another pattern of methyl cyanoacrylate/poly(methyl cyanoacrylate) with a viscosity of 1100 cps will be printed onto the surface. Titanium will be deposited onto the printed surface to form a Ti/PMCA/Ti/PMCA/Ti composite. The process will be repeated until a desired thickness is reached.

An edge of the metal composite sheet will be trimmed to expose the poly(methyl cyanoacrylate) form members, and the trimmed sheet will be placed in a vacuum chamber where it will be heated to about 170° C. to depolymerize the poly(methyl cyanoacrylate) into methyl cyanoacrylate monomer. The methyl cyanoacrylate monomer will leave the composite matrix as a gas. A vacuum will be used to draw off the vaporized monomers, producing a lightweight Ti/void/Ti/void/Ti . . . layered product with columns of Ti connecting the layers. The drawn off vaporized monomers will be condensed and recycled into additional form members.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more or at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for producing a material having voids therein, the method comprising:
    depositing a first layer of shaped members on a surface such that each shaped member is in physical contact with at least another of the shaped member of the first layer, wherein
    each of the shaped members comprises at least one cyanoacrylate polymer;
    depositing a first layer of matrix on the first layer of shaped members, wherein the first layer of matrix comprises a first type of material;
    heating the first layer of shaped members and the first layer of matrix such that the cyanoacrylate polymer is vaporized; and
    removing the vaporized cyanoacrylate polymer from the material to leave behind voids within the material.

2. The method of claim 1, wherein:
    heating comprises heating the first layer of shaped members and the first layer of matrix under vacuum to a temperature sufficient to depolymerize the cyanoacrylate polymer to cyanoacrylate monomers and to vaporize the cyanoacrylate monomers.

3. The method of claim 2, further comprising collecting and recycling the vaporized cyanoacrylate monomers.

4. The method of claim 1, wherein depositing the first layer of shaped members comprises depositing cyanoacrylate polymer droplets onto the surface such that the droplets combine and cure to form the first layer of shaped members, wherein the shaped members are in a predetermined pattern.

5. The method of claim 1, wherein depositing the first layer of shaped members comprises:
    etching parallel aligned grooves in the surface to receive the shaped members thereon; and
    depositing the shaped members in the grooves to form parallel rows of adjoining shaped members.

6. The method of claim 4, wherein:
    depositing droplets of the cyanoacrylate polymer onto the surface comprises printing of the predetermined pattern by propelling the droplets of the cyanoacrylate polymer from inkjet printing head nozzles onto the surface.

7. The method of claim 1, wherein the method further comprises:
    depositing a second layer of shaped members on the first layer of matrix prior to heating the first layer of shaped members and the first layer of matrix, wherein each of the shaped members of the second layer is in physical contact with at least another of the shaped members of the second layer; and
    depositing a second layer of matrix on the second layer of shaped members, wherein the second layer of matrix comprises a second type of material.

8. The method of claim 7, wherein the method further comprises repeating the steps of depositing the second layer of shaped members and depositing the second layer of a matrix until a desired thickness of material is obtained.

9. The method of claim 1, wherein:
    depositing the first layer of shaped members comprises depositing cuboid shaped members having a length dimension in a first range from about 2 micrometers to about 10 micrometers, a width dimension in a second range from about 1 micrometer to about 5 micrometers, and a thickness dimension in a third range from about 1 micrometer to about 5 micrometers, and each of the cuboid shaped members is coupled with an adjacent cuboid shaped member by a spacer portion; and
    depositing the first layer of matrix comprises depositing the first layer of matrix having a thickness in a fourth range from about 1 micrometer to about 5 micrometers.

10. A method for producing a multi-layered material with voids on a multi-station conveyor system comprising a form placement station and a matrix material deposition station pairing for each layer of the multi-layer material and the method comprises:
- in a first form placement station, depositing a first form layer of shaped members on a carrier to carry the first form layer along the conveyor system, wherein each of the shaped members comprises at least one cyanoacrylate polymer;
- conveying the carrier with the first form layer to a first deposition station;
- depositing a first layer of matrix material on the first form layer at the first deposition station;
- conveying the carrier from the first deposition station to a second form placement station;
- depositing a second layer of shaped members on the first layer of matrix material to form a second form layer at the second form placement station;
- conveying the carrier from the second form placement station to a second deposition station;
- depositing a second layer of matrix material on the second form layer at the second deposition station;
- repeating the steps of depositing the second layer of shaped members and depositing the second layer of matrix material until a desired thickness of the multi-layered material is obtained;
- conveying the carrier with the multi-layered material from the second deposition station to a heating and vacuum chamber; and
- vaporizing and removing cyanoacrylate polymer to form the multi-layered material with voids.

11. The method of claim 1, wherein:
- depositing the first layer of matrix on the first layer of shaped members comprises spraying or vapor depositing the first layer of matrix, wherein the first layer of matrix comprises a first type of material selected from the group consisting of metals, polymers, ceramics, resins, and combinations thereof and
- depositing the first layer of shaped members comprises depositing the shaped members comprising the cyanoacrylate polymer selected from the group consisting of polymethyl cyanoacrylate, polyethyl cyanoacrylate, polypropyl cyanoacrylate, polybutyl cyanoacrylate, polyoctyl cyanoacrylate, and combinations thereof.

12. The method of claim 1, wherein the depositing the first layer of shaped members comprises depositing an array of individual shaped members with each of the individual shaped members in physical contact with at least another of the individual shaped members to form a contiguous array of individual shaped members.

13. The method of claim 7, wherein depositing the second layer of matrix comprises depositing the second layer of matrix wherein the second type of material is substantially similar to the first type of material.

14. The method of claim 7, wherein depositing the second layer of matrix comprises depositing the second layer of matrix wherein the second type of material is different from the first type of material.

15. A method for producing a material having voids therein, the method comprising:
- depositing cyanoacrylate polymer droplets onto a surface such that the droplets combine and cure to form a first layer of shaped members in the predetermined pattern of shaped member;
- depositing a first layer of matrix on the first layer of shaped members, wherein the first layer of matrix comprises a first type of material;
- heating the first layer of shaped members and the first layer of matrix such that the cyanoacrylate polymer is vaporized; and
- removing the vaporized cyanoacrylate polymer from the material to leave behind voids within the material.

16. The method of claim 15, wherein:
- depositing the cyanoacrylate polymer droplets comprises depositing the cyanoacrylate polymer selected from the group consisting of polymethyl cyanoacrylate, polyethyl cyanoacrylate, polypropyl cyanoacrylate, polybutyl cyanoacrylate, polyoctyl cyanoacrylate, and combinations thereof and
- depositing the first layer of matrix on the first layer of shaped members comprises spraying or vapor depositing the first layer of matrix, wherein the first layer of matrix comprises the first type of material selected from the group consisting of metals, polymers, ceramics, resins, and combinations thereof.

17. The method of claim 15, wherein:
- heating comprises heating the first layer of shaped members and the first layer of matrix under vacuum to a temperature sufficient to depolymerize the cyanoacrylate polymer to cyanoacrylate monomers and to vaporize the cyanoacrylate monomers.

18. The method of claim 15, wherein the method further comprises:
- depositing a second layer of shaped members on the first layer of matrix prior to heating the first layer of shaped members and the first layer of matrix, wherein each of the shaped member of the second layer is in physical contact with at least another of the shaped members of the second layer; and
- depositing a second layer of matrix on the second layer of shaped members, wherein the second layer of matrix comprises a second type of material.

* * * * *